(12) United States Patent
Yamada et al.

(10) Patent No.: US 9,499,194 B2
(45) Date of Patent: Nov. 22, 2016

(54) ELECTRIC POWER STEERING SYSTEM

(71) Applicant: JTEKT CORPORATION, Osaka-shi, Osaka (JP)

(72) Inventors: Wataru Yamada, Kashiwara (JP); Hirotsugu Kusano, Kashihara (JP); Arata Kikuchi, Soraku-gun (JP); Yoshitomo Nagai, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 184 days.

(21) Appl. No.: 14/332,999

(22) Filed: Jul. 16, 2014

(65) Prior Publication Data
US 2015/0027248 A1    Jan. 29, 2015

(30) Foreign Application Priority Data
Jul. 25, 2013 (JP) .................... 2013-154906

(51) Int. Cl.
*B62D 5/04* (2006.01)
(52) U.S. Cl.
CPC .............. *B62D 5/0409* (2013.01); *B62D 5/04* (2013.01); *Y10T 74/18792* (2015.01)
(58) Field of Classification Search
CPC .... B62D 5/04; B62D 5/0409; B62D 5/0421; B62D 5/0454
See application file for complete search history.

(56) References Cited

U.S. PATENT DOCUMENTS

| | | | |
|---|---|---|---|
| 6,044,723 A | 4/2000 | Eda et al. | |
| 6,491,131 B1 * | 12/2002 | Appleyard | B62D 5/0409 180/444 |
| 7,177,744 B2 * | 2/2007 | Tanaka | B62D 5/0409 180/444 |
| 2003/0146039 A1 * | 8/2003 | Sano | B62D 5/0409 180/444 |
| 2004/0163879 A1 * | 8/2004 | Segawa | B62D 5/0409 180/444 |
| 2004/0245040 A1 * | 12/2004 | Eda | B62D 5/0409 180/444 |
| 2005/0072620 A1 * | 4/2005 | Joushita | F16D 3/68 180/444 |
| 2006/0117889 A1 * | 6/2006 | Segawa | B62D 5/0409 74/425 |
| 2007/0193819 A1 * | 8/2007 | Iwasa | B62D 5/0409 180/444 |
| 2010/0116582 A1 * | 5/2010 | Rho | B62D 5/0409 180/444 |
| 2010/0239199 A1 * | 9/2010 | Nakagawa | B62D 5/0409 384/283 |
| 2011/0120797 A1 * | 5/2011 | Kitahata | B62D 5/04 180/443 |
| 2011/0147113 A1 * | 6/2011 | Ko | B62D 5/0409 180/444 |

(Continued)

FOREIGN PATENT DOCUMENTS

| | | |
|---|---|---|
| DE | 198 22 478 A1 | 12/1998 |
| EP | 0 943 842 A1 | 9/1999 |

(Continued)

OTHER PUBLICATIONS

Dec. 4, 2014 Extended Search Report issued in European Application No. 14177603.9.

*Primary Examiner* — Joseph Rocca
*Assistant Examiner* — Daniel Yeagley
(74) *Attorney, Agent, or Firm* — Oliff PLC

(57) ABSTRACT

In a speed reducer of an electric power steering system, a first bearing supports a first end portion of a worm so that the first end portion is movable in an axial direction. Elastic members elastically support the worm in the axial direction. A second bearing supports a second end portion of the worm. An urging member oscillates and urges the worm. The sum of first frictional resistance in the axial direction between an inner ring of the first bearing and the worm and second frictional resistance in the axial direction between the urging member and an outer circumference of an outer ring of the second bearing is less than engagement frictional resistance in the axial direction of the worm.

6 Claims, 10 Drawing Sheets

(56) References Cited

U.S. PATENT DOCUMENTS

2011/0240399 A1* 10/2011 Suzuki ................ B62D 5/0409
                                                    180/444
2012/0111657 A1    5/2012 Hamakita et al.
2012/0272765 A1* 11/2012 Fuechsel .............. B62D 5/0409
                                                    74/416
2014/0027197 A1*  1/2014 Kikuchi ............... B62D 5/0409
                                                    180/444

FOREIGN PATENT DOCUMENTS

| EP | 1 452 419 A1 | 9/2004 |
| EP | 1 571 067 A1 | 9/2005 |
| EP | 2450262 A1 | 5/2012 |
| JP | 2004301265 A * | 10/2004 |
| JP | A-2004-301263 | 10/2004 |
| JP | 2007-270943 A | 10/2007 |
| JP | A-2012-101649 | 5/2012 |

* cited by examiner

ELECTRIC POWER STEERING SYSTEM

INCORPORATION BY REFERENCE

The disclosure of Japanese Patent Application No. 2013-154906 filed on Jul. 25, 2013 including the specification, drawings and abstract, is incorporated herein by reference in its entirety.

BACKGROUND OF THE INVENTION

1. Field of the Invention

The present invention relates to an electric power steering system.

2. Description of Related Art

In an electric power steering system, torque assistance is provided to a steering operation by transmitting the rotation of a rotary shaft of an electric motor to a worm constituting a speed reducer via a joint, reducing the speed of the rotation with the use of a worm wheel engaging with the worm, and transmitting the rotation, whose speed has been reduced, to a steered mechanism. A backlash is required for engagement between the worm and the worm wheel, and thus, there is a possibility that gear rattle due to the backlash may be generated at the time of traveling.

Thus, conventionally, an electric power steering system has been proposed in which a backlash is removed by elastically oscillating and urging a second bearing that supports one end of the worm toward the worm wheel with the use of an urging member, around a first bearing that supports the other end (motor-side end) of the worm. An electric power steering system has also been proposed in which paired elastic members are arranged on respective sides of an inner ring of a first bearing so as to suppress the backlash of the bearing. For example, such an electric power steering system is disclosed in Japanese Patent Application Publication No. 2012-101649 (JP 2012-101649 A).

It has also been proposed that, in a worm support device in which a worm is oscillated and urged toward a worm wheel and the worm is urged in an axial direction, a curvature radius of a raceway groove of a second bearing is set to be greater than or equal to 52.5% of the diameter of a ball. Such a worm support device is disclosed in Japanese Patent Application Publication No. 2004-301263 (JP 2004-301263 A).

When the urging load of the urging member is increased, the increase in the urging load can contribute to suppression of gear rattle, but steering feeling during fine steering is deteriorated due to increase in frictional resistance at the time of start of movement of the worm in the axial direction during the fine steering. To the contrary, when the urging load of the urging member is decreased, steering feeling during fine steering is improved due to decrease in the frictional resistance at the time of start of movement of the worm in the axial direction during the fine steering, but the gear rattle cannot be suppressed.

SUMMARY OF THE INVENTION

An object of the present invention is to provide an electric power steering system in which gear rattle is suppressed and steering feeling during fine steering is improved.

An electric power steering system according to an aspect of the present invention includes: a worm that has a first end portion and a second end portion; a worm wheel that engages with the worm at an engagement region; a speed reducer that includes the worm and the worm wheel and that reduces a speed of rotation of an electric motor; a housing that houses the speed reducer; a first bearing that includes an outer ring fixed to the housing and an inner ring loosely fitted to the first end portion of the worm, the first bearing supporting the first end portion of the worm so that the first end portion is rotatable and movable in an axial direction; a second bearing that includes an outer ring and an inner ring press-fitted to the second end portion of the worm, the second bearing being supported by the housing so that the second bearing is able to be displaced in a direction in which an inter-center distance between the worm and the worm wheel increases and in a direction in which the inter-center distance decreases, and the second bearing supporting the second end portion of the worm so that the second end portion is rotatable; a first elastic member and a second elastic member that are disposed on respective sides of the inner ring of the first bearing in the axial direction, and that elastically support the worm in the axial direction with respect to the inner ring of the first bearing; and an urging member that urges an outer circumference of the outer ring of the second bearing in the direction in which the inter-center distance decreases. A sum of first frictional resistance in the axial direction between the inner ring of the first bearing and the worm and second frictional resistance in the axial direction between the urging member and the outer circumference of the outer ring of the second bearing is less than engagement frictional resistance in the axial direction of the worm.

In the electric power steering system according to the above-mentioned aspect, due to an urging load with which the urging member urges the outer ring of the second bearing, the second frictional resistance in the axial direction is generated between the urging member and the outer circumference of the outer ring of the second bearing, and the first frictional resistance in the axial direction is generated between the inner ring of the first bearing and the worm. Since the sum of the first frictional resistance and the second frictional resistance is less than the engagement frictional resistance in the axial direction of the worm, it is possible to finely displace the worm in the axial direction without rotating the worm wheel during fine steering. Accordingly, it is possible to prevent gear rattle with the use of the urging member, and to improve steering feeling during fine steering.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
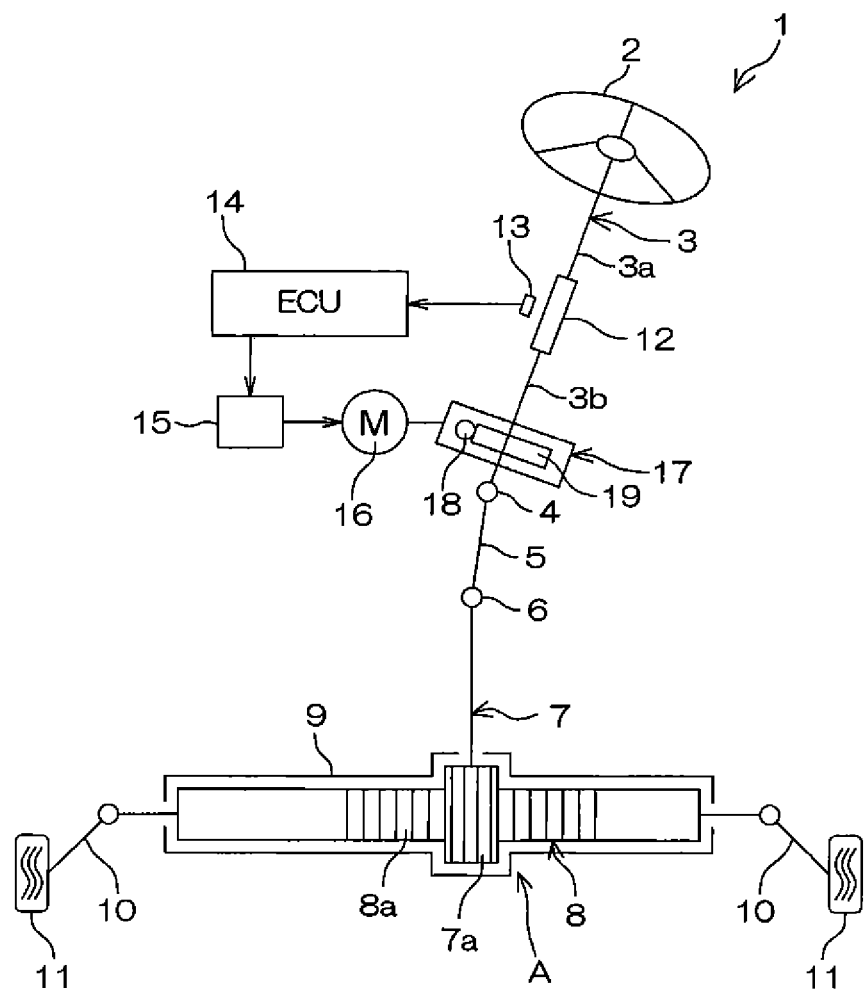
FIG. 1 is a schematic diagram of an electric power steering system according to an embodiment of the present invention.

An exemplary embodiment of the present invention will be described below with reference to the accompanying drawings. FIG. 1 is a diagram schematically illustrating a configuration of an electric power steering system according to an embodiment of the present invention. Referring to FIG. 1, an electric power steering system 1 includes a steering shaft 3 whose one end is connected to a steering member 2 such as a steering wheel, an intermediate shaft 5 connected to the steering shaft 3 via a universal joint 4, a pinion shaft 7 connected to the intermediate shaft 5 via a universal joint 6, and a rack bar 8 that has a rack 8a engaging with a pinion 7a formed in the vicinity of an end of the pinion shaft 7 and that is used as a steered shaft extending the in the right-left direction of a vehicle. A steered mechanism A formed of a rack and pinion mechanism is constituted by the pinion shaft 7 and the rack bar 8.

The rack bar 8 is supported in a housing 9 fixed to a vehicle body with the use of multiple bearings (not illustrated) so as to linearly reciprocate. Both end portions of the rack bar 8 respectively protrude toward the both sides of the housing 9 and each end portion is coupled to a tie rod 10. Each tie rod 10 is connected to a corresponding steered wheel 11 via a knuckle arm (not illustrated). When the steering member 2 is operated and the steering shaft 3 rotates, this rotation is converted to a linear motion of the rack bar 8 in the right-left direction of the vehicle with the use of the pinion 7a and the rack 8a. Accordingly, the steered wheels 11 are steered.

The steering shaft 3 includes a first steering shaft 3a on the input side, whose one end is connected to the steering member 2, a second steering shaft 3b on the output side, which extends toward the pinion shaft 7, and a torsion bar 12 that connects the first steering shaft 3a and the second steering shaft 3b so that the first steering shaft 3a and the second steering shaft 3b are rotatable relative to each other on the same axis. There is provided a torque sensor 13 that detects a steering torque on the basis of a relative rotational displacement amount between the first steering shaft 3a and the second steering shaft 3b that are provided with the torsion bar 12 interposed therebetween. The torque detection result of the torque sensor 13 is supplied to an ECU 14. The ECU 14 controls the driving of a steering-assist electric motor 16 via a drive circuit 15 on the basis of the torque detection result, a vehicle speed detection result supplied from a vehicle speed sensor not illustrated, and the like.

The speed of the output rotation of the electric motor 16 is reduced by a speed reducer 17 as a transmission device, and the output rotation, whose speed has been reduced, is transmitted to the pinion shaft 7, and is converted to a linear motion of the rack bar 8, whereby the steering operation is assisted. The speed reducer 17 includes a worm 18 as a drive gear that is rotationally driven by the electric motor 16, and a worm wheel 19 as a driven gear that engages with the worm 18 and that is connected to the second steering shaft 3b of the steering shaft 3 so as to be rotatable together with the second steering shaft 3b.

Figure 2:
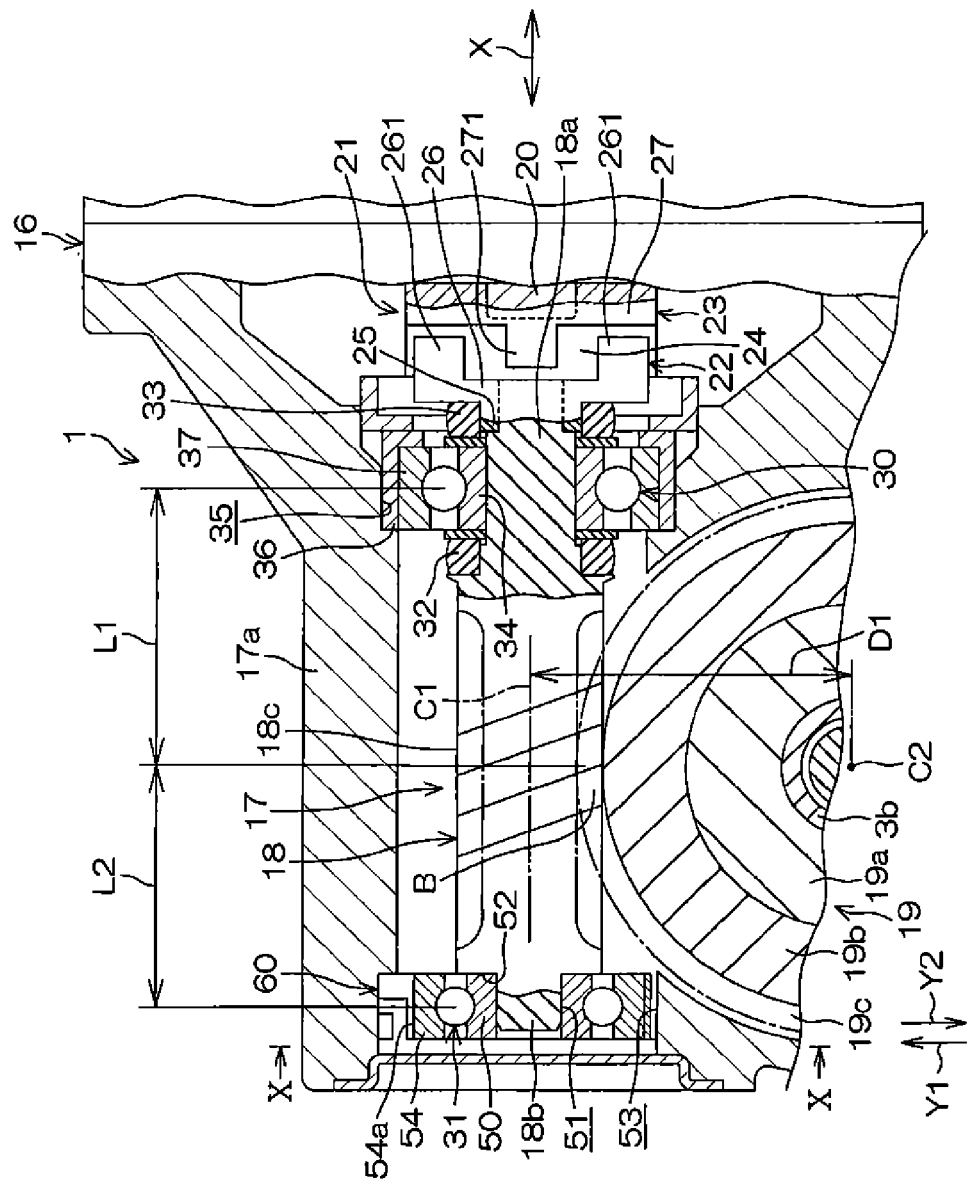
FIG. 2 is a cross-sectional view of a main part of the electric power steering system.

As illustrated in FIG. 2, the worm 18 is disposed coaxially with a rotary shaft 20 of the electric motor 16. The worm 18 includes a first end portion 18a and a second end portion 18b that are separated in the axial length direction and a teeth portion 18c that is disposed between the first end portion 18a and the second end portion 18b. The worm wheel 19 is connected to an axial intermediate portion of the second steering shaft 3b of the steering shaft 3 so that the worm wheel 19 is rotatable together with the second steering shaft 3b and is not movable in an axial direction. The worm wheel 19 includes an annular core 19a coupled to the second steering shaft 3b so as to be rotatable together with the second steering shaft 3b and a synthetic resin member 19b that surrounds the core 19a and that has a teeth portion 19c formed on the outer circumference thereof. For example, the core 19a is inserted into a mold at the time of forming the synthetic resin member 19b using a resin.

The first end portion 18a of the worm 18 and an end portion of the rotary shaft 20 (output shaft) of the electric motor 16 opposed thereto are connected to each other via a joint 21 so as to transmit a torque and to oscillate relative to each other. Specifically, the joint 21 includes a first rotation element 22 that is connected to the first end portion 18a of the worm 18 so as to be rotatable together with the first end portion 18a and so as not to be movable in the axial direction, a second rotation element 23 that is connected to the rotary shaft 20 of the electric motor 16 so as to be rotatable together with the rotary shaft 20 and so as not to be movable in the axial direction, and an elastic member 24 that is interposed between the first rotation element 22 and the second rotation element 23 and that transmits a torque between both rotation elements 22 and 23.

Figure 3:
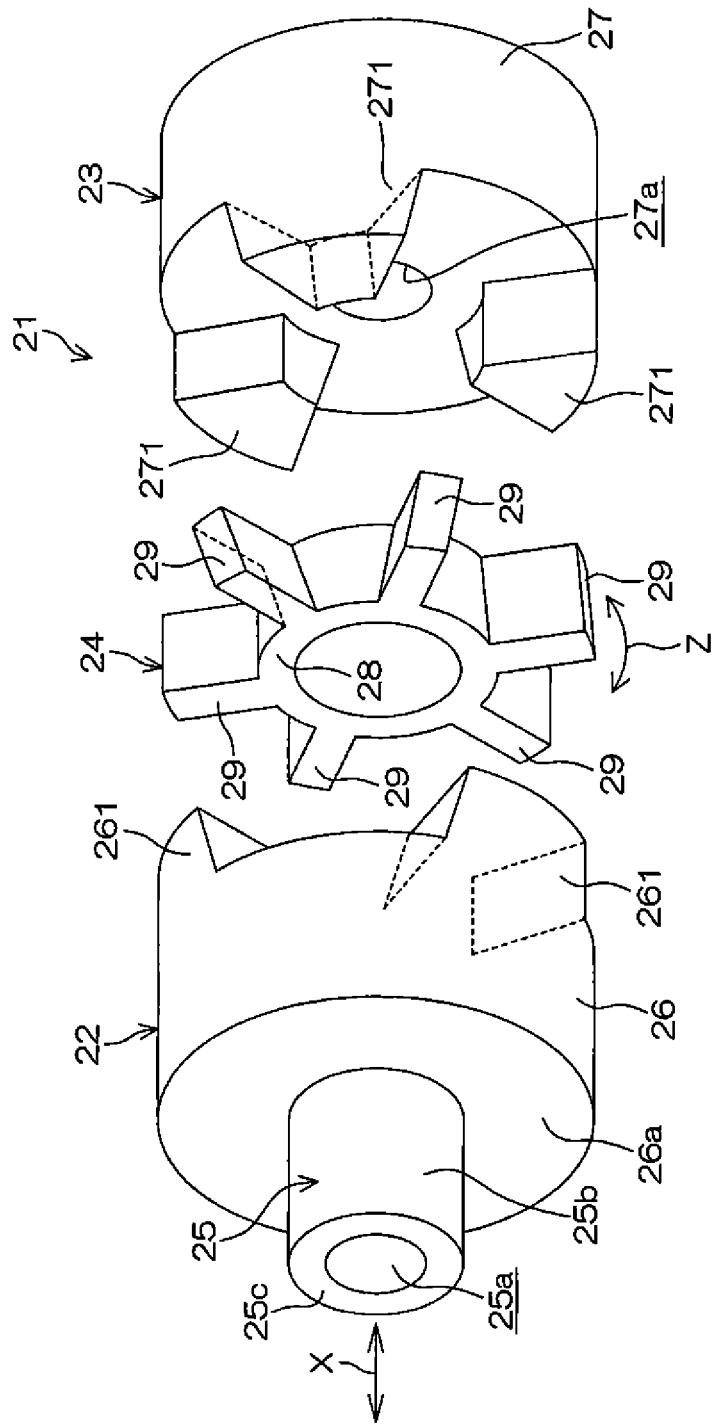
FIG. 3 is an exploded perspective view of a joint.

As illustrated in FIG. 3, the first rotation element 22 includes a boss 25 having a fitting hole 25a into which the first end portion 18a (see FIG. 2) of the worm 18 is pressed, and an annular flange 26 that extends to the outside in a radial direction from the boss 25. The boss 25 is fitted to the first end portion 18a of the worm 18 so as to be rotatable together with the first end portion 18a and so as not to be movable in the axial direction. The second rotation element 23 includes a main body 27 that has a fitting hole 27a into which the rotary shaft 20 (see FIG. 2) of the electric motor 16 is pressed, and that is opposed to the flange 26 of the first rotation element 22 in an axial direction X.

In the flange 26 of the first rotation element 22, multiple engagement protrusions 261 are provided at equal intervals in a circumferential direction Z so as to protrude toward the main body 27 of the second rotation element 23. In the main body 27 of the second rotation element 23, multiple engagement protrusions 271 are provided at equal intervals in the circumferential direction Z so as to protrude toward the flange 26 of the first rotation element 22. The engagement protrusions 261 and the engagement protrusions 271 are alternately arranged in the circumferential direction Z.

The elastic member 24 includes an annular main body portion 28 and multiple engagement arms 29 extending in a radial manner from the main body portion 28. The corresponding engagement arm 29 of the elastic member 24 is held between the engagement protrusions 261 and 271 of the rotation elements 22 and 23, which are adjacent to each other in the circumferential direction Z. Referring to FIG. 2, the first end portion 18a of the worm 18 is rotatably supported by the housing 17a of the speed reducer 17 with the use of a first bearing 30. The second end portion 18b of the worm 18 is rotatably supported by the housing 17a of the speed reducer 17 with the use of a second bearing 31. By elastically deforming the elastic member 24 of the joint 21, the oscillation of the worm 18 around the bearing center of the first bearing 30 relative to the rotary shaft 20 is permitted.

Each of the first bearing 30 and the second bearing 31 is formed of, for example, a ball bearing. A first elastic member 32 and a second elastic member 33 that urge the worm 18 to the neutral position in the axial direction are disposed in the first end portion 18a of the worm 18. The first bearing 30 includes an inner ring 34 that is fitted to the first end portion 18a of the worm 18 so as to be rotatable together with the first end portion 18a, and an outer ring 37 that is held in a bearing hole 35 formed in the housing 17a of the speed reducer 17 with the use of a bush 36.

Figure 4:
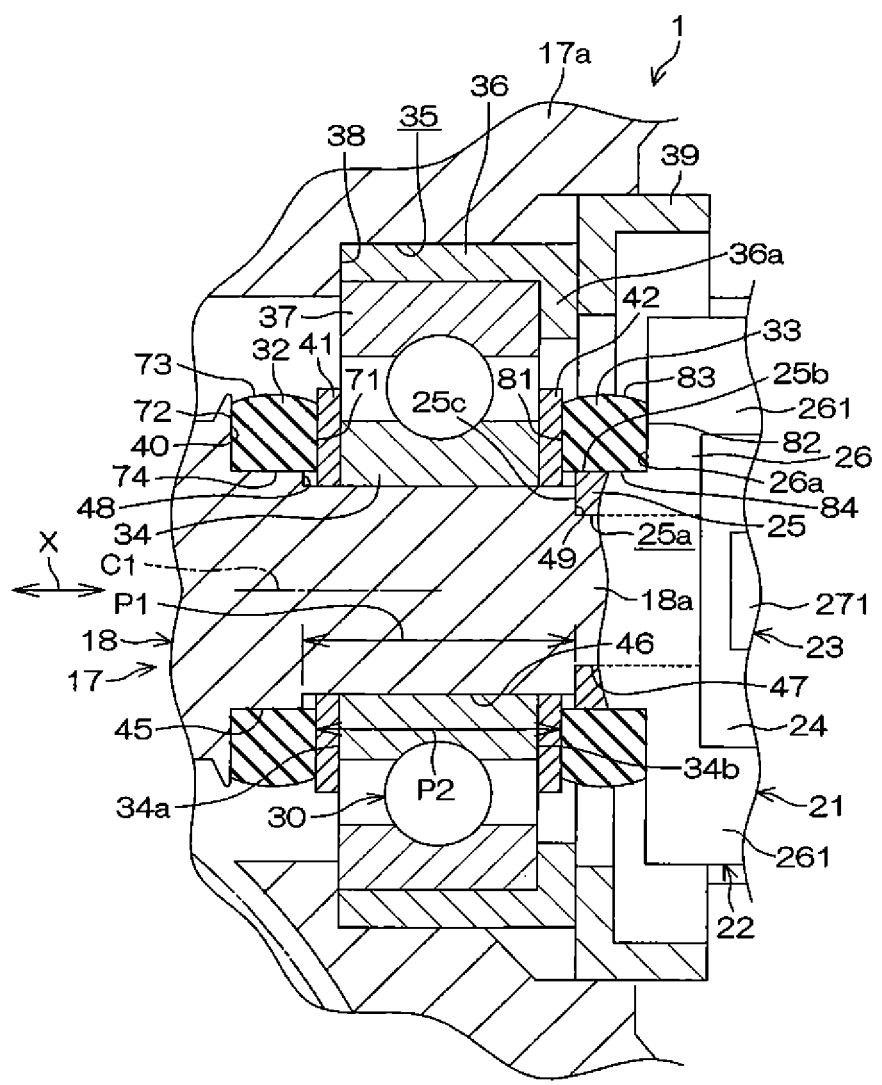
FIG. 4 is an enlarged cross-sectional view of a main part of the electric power steering system, FIG. 4 illustrating a first bearing that supports a worm and an area around the first bearing.

As illustrated in FIG. 4 that is a partial enlarged view of FIG. 2, the outer ring 37 and an annular flange 36a of an end portion of the bush 36 are held in the axial direction between a positioning stepped portion 38 provided in an end portion of the bearing hole 35 and a stopper member 39 screwed to the bearing hole 35. Accordingly, movement of the outer ring 37 in the axial direction is restricted. The inner ring 34 of the first bearing 30 is fitted to the outer circumference of the first end portion 18a of the worm 18 so as to be rotatable together with the first end portion 18a. The first elastic member 32 and the second elastic member 33 are disposed on respective sides of the inner ring 34 in the axial direction X, and elastically urge the worm 18 to the neutral position in the axial direction X. Each of the elastic members 32 and 33 is a bush formed of an elastic material such as rubber or thermoplastic elastomer.

The first elastic member 32 is interposed between an annular stepped portion 40 formed on the outer circumference of the worm 18 and a first annular backing plate 41 that is in contact with a first end face 34a of the inner ring 34, and is compressed in the axial direction X. The second elastic member 33 is interposed between an annular backing plate 42 that is in contact with a second end face 34b of the inner ring 34 and an end face 26a of the flange 26 of the first rotation element 22 of the joint 21, and is compressed in the axial direction X. The backing plates 41, 42 are formed of, for example, metal. The elastic members 32, 33 are formed of rubber and are fixed to the corresponding backing plates 41, 42 by vulcanized adhesion.

The outer circumference of the first end portion 18a is provided with a first portion 45 to which the first elastic member 32 is fitted and at which the first elastic member 32 is held, a second portion 46 as an inner ring fitting portion which has a diameter smaller than that of the first portion 45 and to which the inner ring 34 and the both backing plates 41, 42 are fitted, and a third portion 47 as a boss fitting portion which has a diameter smaller than that of the second portion 46 and to which the boss 25 of the first rotation element 22 is fitted. The second elastic member 33 is fitted to and held at the outer circumference 25b of the boss 25. A positioning stepped portion 48 is formed between the first portion 45 and the second portion 46 (the inner ring fitting portion). The positioning stepped portion 48 is opposed to the first backing plate 41, which is in contact with the first end face 34a of the inner ring 34, with a predetermined gap interposed therebetween.

A positioning stepped portion 49 is formed between the second portion 46 and the third portion 47. The end face 25c of the boss 25 comes in contact with the positioning stepped portion 49 and the boss 25 is positioned in the axial direction X relative to the worm 18. The distance P1 between the positioning stepped portion 48 and the end face 25c of the boss 25 is set to be larger than the distance P2 between the outside end faces of the backing plates 41, 42. The difference (P1−P2) between both distances P1, P2 corresponds to a movable range of the worm 18 in the axial direction X (for example, 0.3 mm from the neutral position to each of right and left sides in FIG. 4, and total 0.6 mm).

Figure 5:
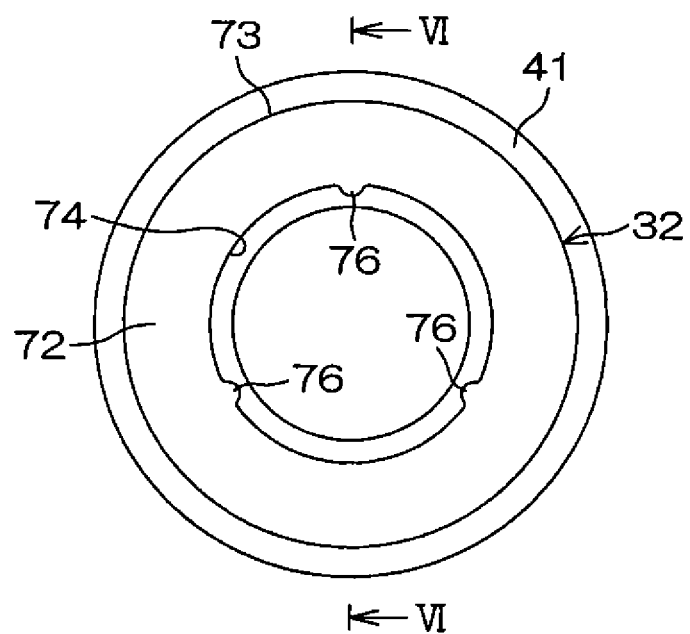
FIG. 5 is a front view of a first elastic member fixed to a first backing plate.
Figure 6:
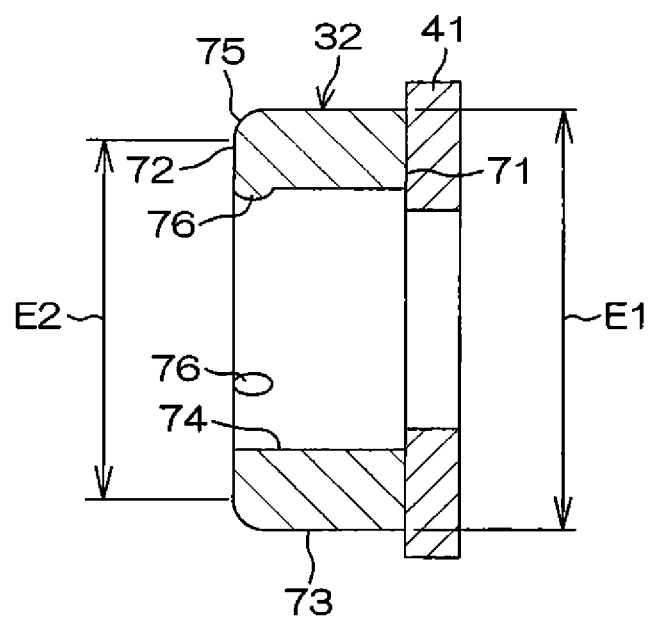
FIG. 6 is a cross-sectional view of the first elastic member fixed to the first backing plate, FIG. 6 corresponding to a cross-section taken along a line VI-VI in FIG. 5.

As illustrated in FIG. 5 and FIG. 6 that is a cross-sectional view taken along a line VI-VI in FIG. 5, the first elastic member 32 includes a first end face 71 that is fixed to the first backing plate 41, a second end face 72 that frictionally engages with the annular stepped portion 40 of the worm 18, an outer circumference 73, and an inner circumference 74 that surrounds the outer circumference of the worm 18, and thus, the first elastic member 32 has an annular shape. The first elastic member 32 has a chamfered portion 75 formed of, for example, an R-chamfered portion (round chamfered portion) between the outer circumference 73 and the second end face 72. The chamfered portion may be a C-chamfered portion (45-degree chamfered portion). Accordingly, the outside diameter E2 of the second end face 72 is smaller than the outside diameter E1 of the first end face 71 in the first elastic member 32 (E2<E1).

Figure 14A:
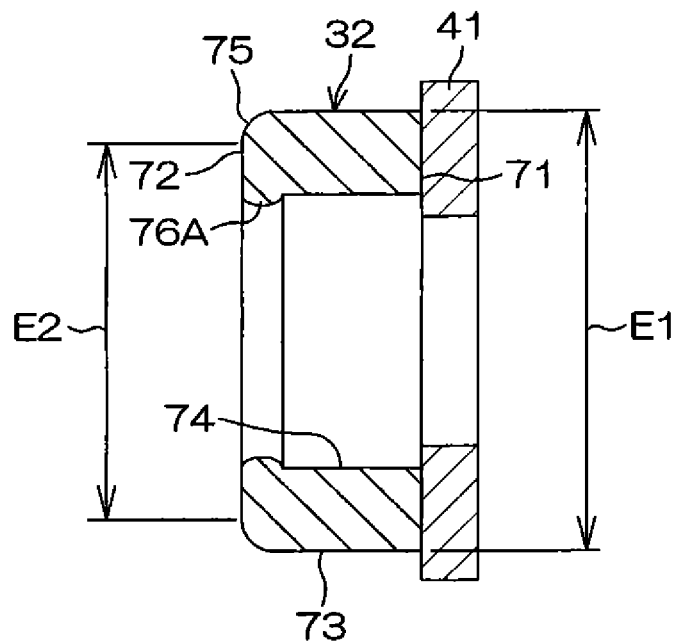
FIG. 14A is a cross-sectional view of a first elastic member in yet another embodiment of the present invention.

As illustrated in FIGS. 4 to 6, the first elastic member 32 includes multiple elastic protrusions 76 that are arranged at equal intervals in the circumferential direction of the inner circumference 74 and that are fitted to the outer circumference (the first portion 45) of the worm 18. The elastic protrusions 76 are arranged close to the second end face 72. In the inner circumference 74 of the first elastic member 32, a tightening margin (interference) with respect to the outer circumference (the first portion 45) of the worm 18 is provided for only the elastic protrusions 76. In the example illustrated in FIGS. 5, 6, the elastic protrusions 76 are arranged at equal intervals in the circumferential direction on the inner circumference 74 of the first elastic member 32. However, instead of employing this configuration, an annular elastic protrusion 76A that is arranged over the entire circumference in the circumferential direction of the inner circumference 74 of the first elastic member 32 and that is fitted to the outer circumference (the first portion 45) of the worm 18 may be provided as illustrated in FIG. 14A.

Figure 7:
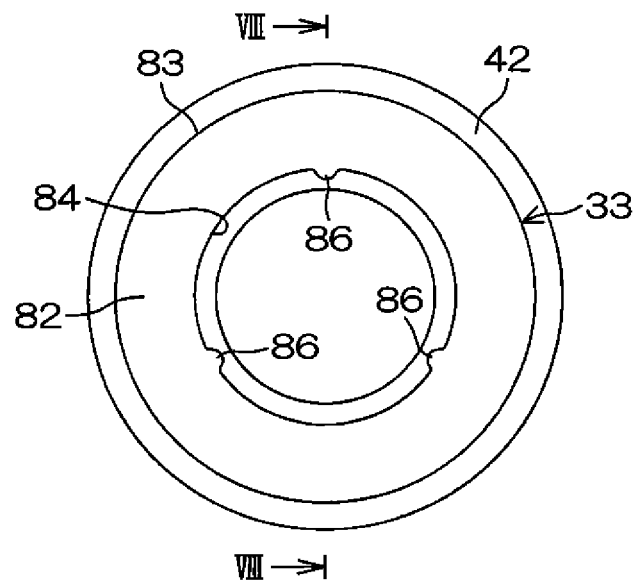
FIG. 7 is a front view of a second elastic member fixed to a second backing plate.
Figure 8:
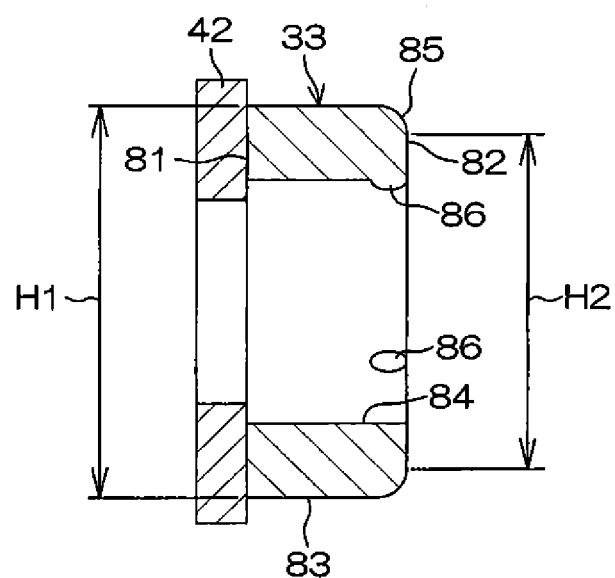
FIG. 8 is a cross-sectional view of the second elastic member fixed to the second backing plate, FIG. 8 corresponding to a cross-section taken along a line VIII-VIII in FIG. 7.

As illustrated in FIG. 7 and FIG. 8 that is a cross-sectional view taken along a line VIII-VIII in FIG. 7, the second elastic member 33 includes a first end face 81 that is fixed to the second backing plate 42, a second end face 82 that frictionally engages with the end face 26a of the flange 26 of the first rotation element 22, an outer circumference 83, and an inner circumference 84 that surrounds the outer circumference 25b of the boss 25 of the first rotation element 22, and thus, the second elastic member 33 has an annular shape. The second elastic member 33 has a chamfered portion 85 formed of, for example, an R-chamfered portion (round chamfered portion) between the outer circumference 83 and the second end face 82. The chamfered portion may be a C-chamfered portion (45-degree chamfered portion). Accordingly, the outside diameter H2 of the second end face 82 is smaller than the outside diameter H1 of the first end face 81 in the second elastic member 33 (H2<H1).

Figure 14B:
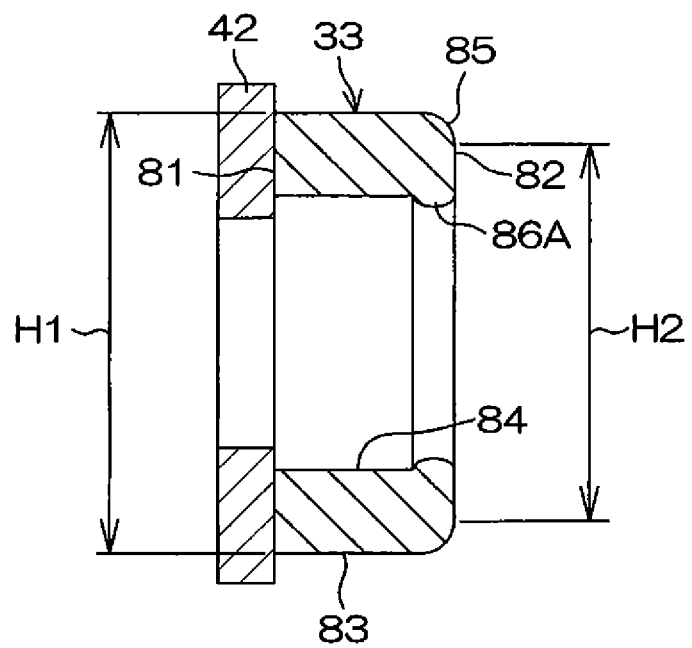
FIG. 14B is a cross-sectional view of a second elastic member in the other embodiment of the present invention.

As illustrated in FIGS. 4, 7, and 8, the second elastic member 33 includes multiple elastic protrusions 86 that are arranged at equal intervals in the circumferential direction of the inner circumference 84 and that are fitted to the outer circumference 25b of the boss 25 of the first rotation element 22. The elastic protrusions 86 are arranged close to the second end face 82. In the inner circumference 84 of the second elastic member 33, a tightening margin (interference) with respect to the outer circumference 25b of the boss 25 is provided for only the elastic protrusions 86. In the example illustrated in FIGS. 7, 8, the elastic protrusions 86 are arranged at equal intervals in the circumferential direction on the inner circumference 84 of the second elastic member 33. However, instead of employing this configuration, an annular elastic protrusion 86A that is arranged over the entire circumference in the circumferential direction of the inner circumference 84 of the second elastic member 33 and that is fitted to the outer circumference 25b of the boss 25 may be provided as illustrated in FIG. 14B.

Figure 9:
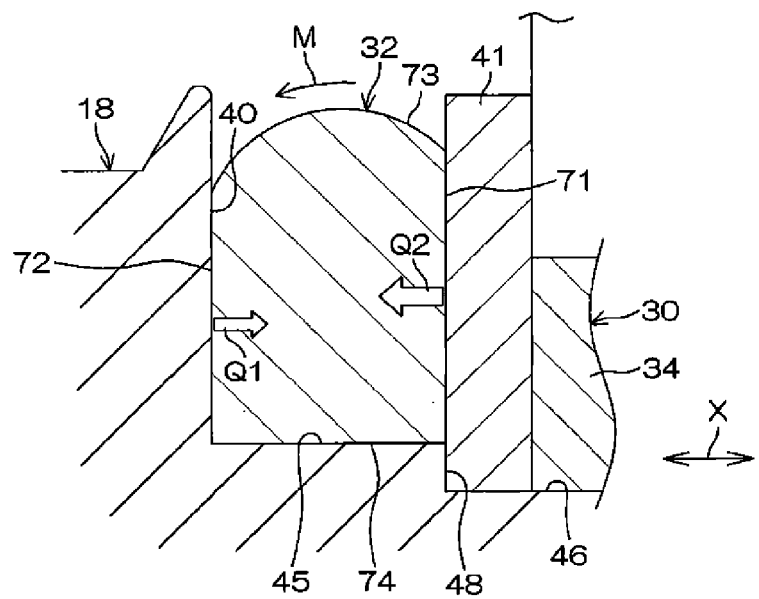
FIG. 9 is a schematic view illustrating a state in which the first elastic member is compressed in an axial direction.

As illustrated in FIG. 6, since the chamfered portion 75 is formed between the outer circumference 73 and the second end face 72, a contact circle between the second end face 72 and the annular stepped portion 40 has a diameter smaller than that of a contact circle between the first end face 71 and the first backing plate 41. Accordingly, as illustrated in FIG. 9, when the first elastic member 32 is compressed in the axial direction X, the position of a reaction load Q1 received by the second end face 72 of the first elastic member 32 from the annular stepped portion 40 of the worm 18 is located radially inside the position of a pressing load Q2 received by the first end face 71 of the first elastic member 32 from the first backing plate 41.

Accordingly, when the first elastic member 32 is compressed and deformed, a moment load M can be generated in such a direction as to suppress the spreading of the second end face 72 of the first elastic member 32 toward the outside in the radial direction due to sliding on the annular stepped portion 40 of the worm 18. When the first elastic member 32 is compressed and deformed in the axial direction X, it is possible to suppress the spreading of the second end face 72 of the first elastic member 32 toward the outside in the radial direction as much as possible, and thus to suppress decrease in the load of the first elastic member 32.

Although not illustrated, when the second elastic member 33 is compressed in the axial direction X, it is possible to suppress the spreading of the second end face 82 of the second elastic member 33 toward the outside in the radial direction, and thus to suppress decrease in the load of the second elastic member 33. Referring to FIG. 2 and FIG. 4, the inner ring 50 of the second bearing 31 is fitted to a fitting recessed portion 51 provided on the outer circumference of the second end portion 18b of the worm 18 so that the inner ring 50 is rotatable together with the second end portion 18b. One end face of the inner ring 50 is in contact with the positioning stepped portion 52 provided on the outer circumference of the second end portion 18b and thus the movement of the inner ring 50 in the axial direction relative to the worm 18 is restricted.

The housing 17a is provided with a bearing hole 53 for supporting the second bearing 31. The bearing hole 53 is formed as a bias hole that can support the second bearing 31 so that the second bearing 31 can be biased in a direction Y1 in which the inter-center distance D1 between the worm 18 and the worm wheel 19 (corresponding to the distance between the rotation center C1 of the worm 18 and the rotation center C2 of the worm wheel 19) increases and in a direction Y2 in which the inter-center distance decreases.

Figure 10:
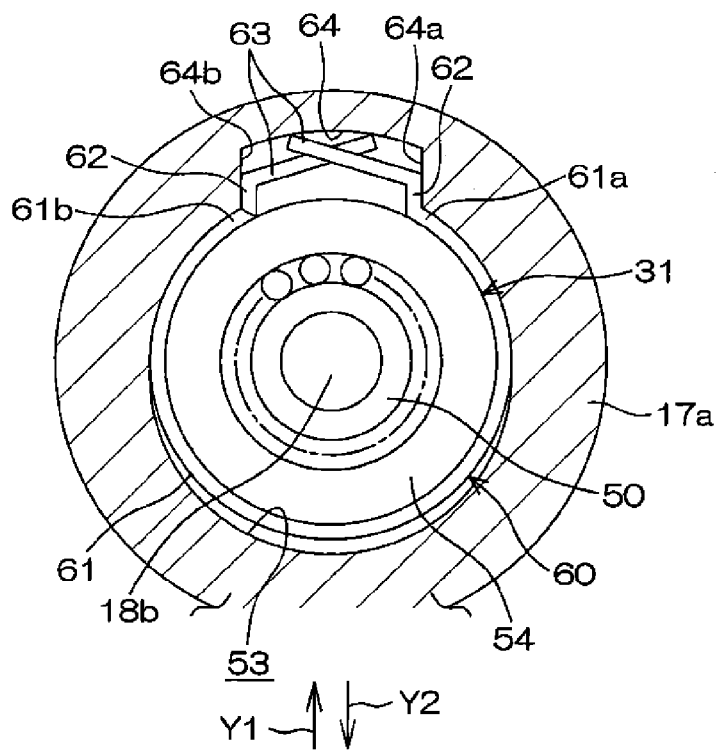
FIG. 10 is a cross-sectional view taken along a line X-X in FIG. 2.

An urging member 60 formed of, for example, an annular leaf spring is interposed between the inner circumference of the bearing hole 53 and the outer ring 54 of the second bearing 31. The urging member 60 urges the second bearing 31 in the direction Y2 in which the inter-center distance D1 decreases. The urging member 60 is a thin plate member formed of, for example, sheet metal. Referring to FIG. 10 that is a cross-sectional view taken along a line V-V in FIG. 2 and FIG. 11 that is a perspective view, the urging member 60 includes a main body 61 with an ended annular shape, which surrounds the outer circumference 54a of the outer ring 54 of the second bearing 31, paired rotation restricting portions 62 that respectively extend from and bend with respect to a first end portion 61a and a second end portion 61b which are end portions of the main body 61 in the circumferential direction, and paired elastic tongue pieces 63 with a cantilever shape, which respectively extend from and bend with respect to the rotation restricting portions 62.

Figure 11:
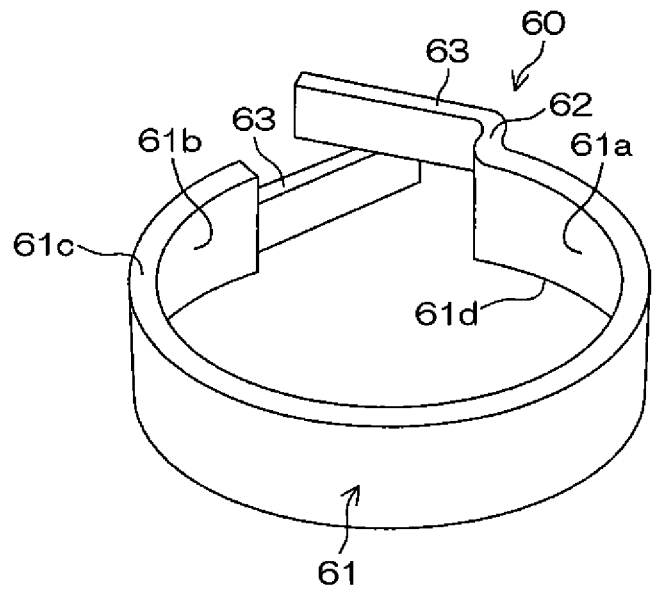
FIG. 11 is a perspective view of a leaf spring as an urging member.

The width of each rotation restricting portion 62 is less than the width of the main body 61. The main body 61 is supported on the inner circumference of the bearing hole 53 of the housing 17a by frictional engagement. As illustrated in FIG. 11, one of the elastic tongue pieces 63 is disposed on a first lateral edge 61c-side and the other elastic tongue piece 63 is disposed on a second lateral edge 61d-side, and thus, both elastic tongue pieces are disposed to cross each other. Referring to FIG. 10, in the bearing hole 53 of the housing 17a, a receiving recessed portion 64 that is recessed in the direction (the direction Y1 in which the inter-center distance increases) opposite to the worm wheel 19-side (the direction Y2 in which the inter-center distance decreases) relative to the second bearing 31 is formed in a part on the inner circumference. The distal ends of the elastic tongue pieces 63 of the urging member 60 are received in the bottom 64c of the receiving recessed portion 64 of the bearing hole 53 and the urging force of the elastic tongue pieces 63 urges the second end portion 18b of the worm 18 via the second bearing 31 in the direction Y2 in which the inter-center distance D1 decreases.

The receiving recessed portion 64 includes paired inner walls 64a, 64b facing each other in the circumferential direction Z of the bearing hole 53 and the rotation restricting portions 62 of the urging member 60 are in contact with the inner walls 64a, 64b facing each other, so as to restrict the rotation of the urging member 60 in the circumferential direction Z of the bearing hole 53.

Figure 12:
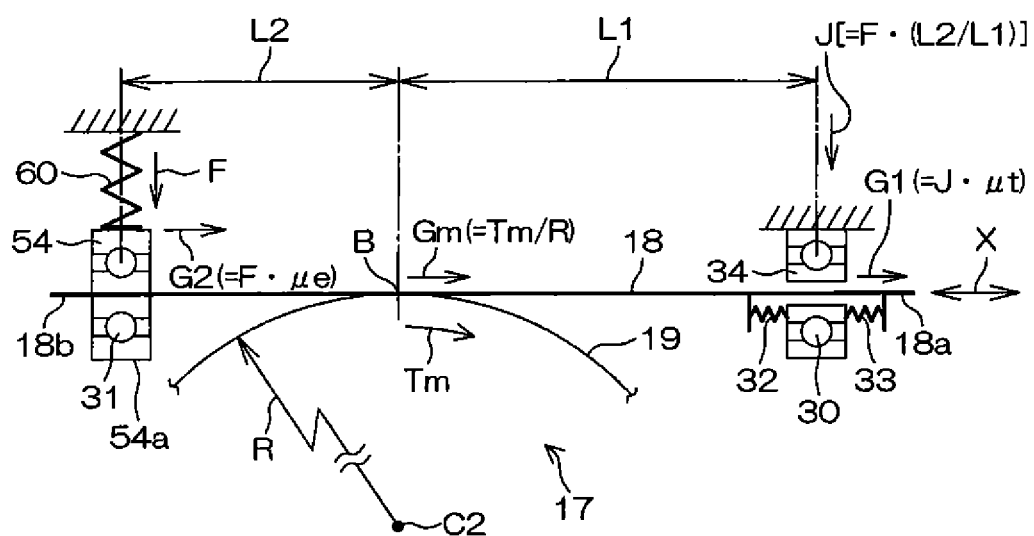
FIG. 12 is a schematic diagram of a worm support structure.

FIG. 12 is a schematic diagram of a worm support structure. The urging load of the urging member 60 is defined as F, a coefficient of friction in the axial direction X between the urging member 60 and the outer circumference 54a of the outer ring 54 of the second bearing 31 is defined as μe. The frictional resistance G2 between the urging member 60 and the outer circumference 54a of the outer ring 54 of the second bearing 31 moving in the axial direction X together with the worm 18 is equal to the product of the urging load F and the friction coefficient μe, and is expressed by Expression (4).

$$G2 = F \cdot \mu e \quad (4)$$

The urging load F applied to the second end portion 18b of the worm 18 via the second bearing 31 generates a moment in the counter-clockwise direction in FIG. 12 with an engagement region B as a fulcrum point. Accordingly, a reaction force J generating a moment in the clockwise direction balanced with the moment in the counter-clockwise direction is applied to the first end portion 18*a* of the worm 18 in a direction parallel to the urging load F.

That is, when the distance between the bearing center of the first bearing 30 and the engagement region B in the axial direction X of the worm 18 is defined as L1 and the distance between the bearing center of the second bearing 31 and the engagement region B in the axial direction X of the worm 18 is defined as L2, Expression (5) is established from the balance of moments. Expression (6) is derived from Expression (5).

$$F \cdot L2 = J \cdot L1 \quad (5)$$

$$J = F \cdot (L2/L1) \quad (6)$$

When a coefficient of friction in the axial direction X between the inner ring 34 of the first bearing 30 and the worm 18 is defined as frictional resistance G1 in the axial direction X between the inner ring 34 of the first bearing 30 and the worm 18 is expressed by Expression (7). That is, Expression (8) is established.

$$G1 = J \cdot \mu t \quad (7)$$

$$G1 = F \cdot (L2/L1) \cdot \mu t \quad (8)$$

When an engagement frictional torque at the engagement region B is defined as Tm and the pitch circle radius of the worm wheel 19 is defined as R, engagement frictional resistance Gm in the axial direction X of the worm 18 is expressed by Expression (9).

$$Gm = Tm/R \quad (9)$$

In this embodiment, the sum (G1+G2) of the frictional resistance G1 in the axial direction X between the inner ring 34 of the first bearing 30 and the worm 18 and the frictional resistance G2 in the axial direction X between the urging member 60 and the outer circumference 54*a* of the outer ring 54 of the second bearing 31 is less than the engagement frictional resistance Gm in the axial direction X of the worm 18. That is, Expression (10) is established.

$$(G1+G2) < Gm \quad (10)$$

A first frictional torque T1 generated due to the first frictional resistance G1 in the axial direction X of the worm 18 is expressed by Expression (1).

$$T1 = F \cdot (L1/L2) \cdot \mu t \cdot R \quad (1)$$

A second frictional torque T2 generated due to the second frictional resistance G2 in the axial direction of the worm 18 is expressed by Expression (2).

$$T2 = F \cdot \mu e \cdot R \quad (2)$$

In this embodiment, the sum (T1+T2) of the first frictional torque T1 and the second frictional torque T2 is less than an engagement frictional torque Tm generated due to the engagement frictional resistance Gm at the engagement region B. That is, Expression (3) is established.

$$(T1+T2) < Tm \quad (3)$$

According to this embodiment, due to the urging load F with which the urging member 60 urges the outer ring 54 of the second bearing 31, the second frictional resistance G2 in the axial direction X is generated between the urging member 60 and the outer circumference 54*a* of the outer ring 54 of the second bearing 31, and the first frictional resistance G1 in the axial direction X is generated between the inner ring 34 of the first bearing 30 and the worm 18. Since the sum of the first frictional resistance and the second frictional resistance (G1+G2) is less than the engagement frictional resistance Gm in the axial direction X of the worm 18, and thus, the expression of (G1+G2)<Gm is satisfied, it is possible to finely displace the worm 18 in the axial direction X without rotating the worm wheel 19 during fine steering. Accordingly, it is possible to prevent gear rattle with the use of the urging member 60, and to improve steering feeling during fine steering.

The relationship between the urging load F of the urging member 60 and the friction coefficients μe, μt is adjusted using Expressions (1), (2) so that the sum (T1+T2) of the first frictional torque T1 generated due to the first frictional resistance G1 in the axial direction X between the inner ring 34 of the first bearing 30 and the worm 18 and the second frictional torque T2 generated due to the frictional resistance G2 in the axial direction X between the urging member 60 and the outer circumference 54*a* of the outer ring 54 of the second bearing 31 is less than the engagement frictional torque Tm generated due to the engagement frictional resistance Gin at the engagement region B and thus Expression (3) is established. Accordingly, it is substantially possible to prevent gear rattle using the urging of the urging member 60, and to improve steering feeling during fine steering.

Since the first backing plate 41 is disposed only on the side of the first end face 71 of the first elastic member 32 and the second backing plate 42 is disposed only on the side of the first end face 81 of the second elastic member 33, it is possible to simplify the structure. Since the chamfered portions 75, 85 are respectively formed between the outer circumferences 73, 83 and the second end faces 72, 82 in the first elastic member 32 and the second elastic member 33 and thus the outside diameters E2, H2 of the second end faces 72, 82 are respectively less than the outside diameters El, H1 of the first end faces 71, 81 (E2<E1 and H2<H1), the following advantages are achieved.

The position of the reaction load Q1 received by each of the elastic members 32, 33 from a corresponding one of the annular stepped portion 40 of the worm 18 and the flange 26 of the first rotation element 22 is located radially inside the position of the pressing load Q2 received by each of the first end faces 71, 81 of the elastic members 32, 33 from a corresponding one of the backing plates 41, 42 (see FIG. 9). Accordingly, when the elastic members 32, 33 are compressed and deformed, it is possible to generate the moment load M in such a direction as to suppress the spreading of the second end faces 72, 82 of the elastic members 32, 33 toward the outside in the radial direction. When the elastic members 32, 33 are compressed and deformed in the axial direction X, it is possible to suppress the spreading of the second end faces 72, 82 of the elastic members 32, 33 toward the outside in the radial direction as much as possible, and thus to suppress the decrease in the load of the elastic members 32, 33.

Since the multiple elastic protrusions 76, 86 are arranged at equal intervals in the circumferential direction on the inner circumferences 74, 84 of the elastic members 32, 33, the elastic members 32, 33 can be easily aligned concentrically with respect to the worm 18 and the first rotation element 22, respectively, and can be concentrically fitted to the worm 18 and the first rotation element 22, respectively. Particularly, it is possible to employ an assembling method (not illustrated) in which the third portion 47 of the worm 18 is pressed into the fitting hole 25*a* of the boss 25 in a state where the second elastic member 33 is fitted to and integrated with the boss 25 of the first rotation element 22 in advance. Thus, assembling can be facilitated.

The tightening margin (interference) is provided for only the elastic protrusions 76, 86, in the inner circumferences 74, 84 of the elastic members 32, 33. Therefore, it is possible to reliably align the elastic members 32, 33 concentrically with respect to the worm 18 and the first rotation element 22, respectively. Accordingly, it is possible to suppress occurrence of uneven abrasion of the elastic members 32, 33. The elastic protrusions 76 of the first elastic member 32 are disposed close to the second end face 72 that is the fitted side of the first elastic member 32, the fitted side being fitted to the first portion 45 of the worm 18. Therefore, the first elastic member 32 can be fitted to the worm 18 more easily. Similarly, the elastic protrusions 86 of the second elastic member 33 are disposed close to the second end face 82 that is the fitted side of the second elastic member 33, the fitted side being fitted to the boss 25 of the first rotation element 22. Therefore, the second elastic member 33 can be fitted to the boss 25 of the first rotation element 22 more easily.

Figure 13:
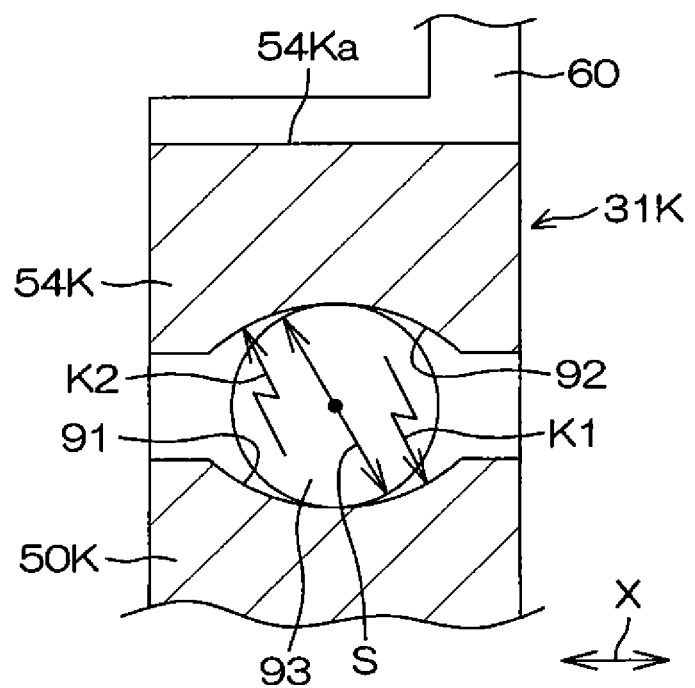
FIG. 13 is a schematic cross-sectional view of a second bearing in another embodiment of the present invention.

The present invention is not limited to the above-mentioned embodiment. For example, a second bearing 31K as illustrated in FIG. 13 may be used. In the second bearing 31K, a curvature radius K1 of a raceway surface 91 of an inner ring 50K and a curvature radius K2 of a raceway surface 92 of an outer ring 54K are greater than or equal to 60% of a diameter S of a rolling element 93 as a ball. That is, K1≥0.6·S and K2≥0.6·S are satisfied. In this case, since the axial rigidity of the second bearing 31K can be reduced, there is an advantage that the coefficient of friction μe in the axial direction X between the urging member and an outer circumference 54Ka of the outer ring 54K of the second bearing 31K does not need to be excessively reduced.

As illustrated in FIG. 14A, the first elastic member 32 may be provided with an annular elastic protrusion 76A that is disposed to extend along the entire circumference in the circumferential direction of the inner circumference 74 of the first elastic member 32 and that is fitted to the outer circumference (the first portion 45 (not illustrated in FIG. 14A)) of the worm 18, instead of the multiple elastic protrusions 76 illustrated in FIGS. 5 and 6. As illustrated in FIG. 14B, the second elastic member 33 may be provided with an annular elastic protrusion 86A that is disposed to extend along the entire circumference in the circumferential direction of the inner circumference 84 of the second elastic member 33 and that is fitted to the outer circumference 25b (not illustrated in FIG. 14B) of the boss 25, instead of the multiple elastic protrusions 86 illustrated in FIGS. 7, 8.

In the above-mentioned embodiment, the steering assist force of the electric motor is applied to the steering shaft. However, instead of employing this configuration, the steering assist force of the electric motor may be applied to the pinion shaft.

What is claimed is:

1. An electric power steering system comprising:
a worm that has a first end portion and a second end portion;
a worm wheel that engages with the worm at an engagement region;
a speed reducer that includes the worm and the worm wheel and that reduces a speed of rotation of an electric motor;
a housing that houses the speed reducer;
a first bearing that includes an outer ring fixed to the housing and an inner ring loosely fitted to the first end portion of the worm, the first bearing supporting the first end portion of the worm so that the first end portion is rotatable and movable in an axial direction;
a second bearing that includes an outer ring and an inner ring, the inner ring of the second bearing being press-fitted to the second end portion of the worm, the second bearing being supported by the housing so that the second bearing is able to be displaced in a direction in which an inter-center distance between the worm and the worm wheel increases and in a direction in which the inter-center distance decreases, and the second bearing supporting the second end portion of the worm so that the second portion is rotatable and movable in an axial direction;
a first elastic member and a second elastic member that are disposed on respective sides of the inner ring of the first bearing in the axial direction, and that elastically support the worm in the axial direction with respect to the inner ring of the first bearing; and
an urging member that urges an outer circumference of the outer ring of the second bearing in the direction in which the inter-center distance decreases, further comprising:
a joint that includes a first rotation element having a boss fixed to the first end portion of the worm and a flange extending from the boss, and a second rotation element fixed to a rotary shaft of the electric motor, the joint connecting the worm and the rotary shaft so as to transmit a torque;
a first annular backing plate that is interposed between a first end face of the inner ring of the first bearing and the first elastic member; and
a second annular backing plate that is interposed between a second end face of the inner ring of the first bearing and the second elastic member,
wherein the first elastic member has an annular shape and the first elastic member includes:
(i) a first end face fixed to the first backing plate,
(ii) a second end face frictionally engaging with an annular stepped portion formed on an outer circumference of the worm,
(iii) an outer circumference, and
(iv) an inner circumference surrounding the outer circumference of the worm, and
wherein the second elastic member has an annular shape, and the second elastic member includes:
(i) a first end face fixed to the second backing plate,
(ii) a second end face frictionally engaging with the flange of the first rotation element,
(iii) an outer circumference, and
(iv) an inner circumference surrounding an outer circumference of the boss of the first rotation element;
wherein a sum of first frictional resistance in the axial direction between the inner ring of the first bearing and the worm and second frictional resistance in the axial direction between the urging member and the outer circumference of the outer ring of the second bearing is less than an engagement frictional resistance in the axial direction of the worm, and
wherein when an urging load of the urging member is defined as F, a coefficient of friction in the axial direction between the urging member and the outer ring of the second bearing is defined as $\mu e$, a coefficient of friction in the axial direction between the inner ring of the first bearing and the worm is defined as $\mu t$, a distance between a bearing center of the first bearing and the engagement region in the axial direction of the worm is defined as L1, a distance between a bearing center of the second bearing and the engagement region in the axial direction of the worm is defined as L2, a pitch circle radius of the worm wheel is defined as R, a first frictional torque generated due to the first frictional resistance in the axial direction between the inner ring of the first bearing and the worm is defined as T1, a second frictional torque generated due to the second frictional resistance in the axial direction between the urging member and the outer circumference of the outer ring of the second bearing is defined as T2, and an engagement frictional torque generated due to the engagement frictional resistance at the engagement region is defined as Tm, expressions (1), (2), and (3) are satisfied:

$$T1 = F \cdot (L1/L2) \cdot \mu t \cdot R \quad (1);$$

$$T2 = F \cdot \mu e \cdot R \quad (2); \text{ and}$$

$$(T1 + T2) < Tm \quad (3).$$

2. The electric power steering system according to claim 1, wherein a curvature radius of a raceway surface of each of the inner ring and the outer ring of the second bearing is greater than or equal to 60% of a diameter of a rolling element.

3. The electric power steering system according to claim 1, wherein the first elastic member has a chamfered portion between the outer circumference of the first elastic member and the second end face of the first elastic member, the second elastic member has a chamfered portion between the outer circumference of the second elastic member and the second end face of the second elastic member an outside diameter of the second end face of the first elastic member is less than an outside diameter of the first end face of the first elastic member, and an outside diameter of the second end face of the second elastic member is less than an outside diameter of the first end face of the second elastic member.

4. The electric power steering system according to claim 1, wherein the first elastic member includes multiple elastic protrusions that are arranged at equal intervals in a circumferential direction of the inner circumference of the first elastic member and that are fitted to the outer circumference of the worm, or an annular elastic protrusion that is disposed to continuously extend along the entire inner circumference of the first elastic member and that is fitted to the outer circumference of the worm, and wherein the second elastic member includes multiple elastic protrusions that are arranged at equal intervals in a circumferential direction of the inner circumference of the second elastic member and that are fitted to the outer circumference of the boss, or an annular elastic protrusion that is disposed to continuously extend along the entire inner circumference of the second elastic member and that is fitted to the outer circumference of the boss.

5. The electric power steering system according to claim 4, wherein a tightening margin is provided for only the multiple elastic protrusions, in the inner circumference of each of the first elastic member and the second elastic member.

6. The electric power steering system according to claim 4, wherein either the multiple elastic protrusions or the annular elastic protrusion of the first elastic member is disposed close to the second end face of the first elastic member, and either the multiple elastic protrusions or the annular elastic protrusion of the second elastic member is disposed close to the second end face of the second elastic member.

* * * * *